United States Patent

[11] 3,548,982

[72] Inventors Pavel Alexandrovich Soloviev
Komsomolsky prospekt, 90, kv. 21;
Georgy Petrovich Kalashnikov, ul. Geroev
Khasana, 16, kv. 53; **Lev Izrailevich
Kantor**, ul. Geroev Khasana, 30, kv. 37;
Sergei Nikolaevich Zamotin, Komsomolsky
prospekt, 73, kv. 19, Perm, U.S.S.R.
[21] Appl. No. 762,941
[22] Filed Sept. 26, 1968
[45] Patented Dec. 22, 1970

[54] FREE-WHEELING CLUTCH
4 Claims, 3 Drawing Figs.
[52] U.S. Cl. .................................................. 192/45
[51] Int. Cl. .......................................... F16d 15/00

[50] Field of Search ................................ 192/38, 44,
45, 27; 188/82.84; 81/59.1

[56] References Cited
UNITED STATES PATENTS
2,068,773  1/1937  Slider .......................... 192/45

*Primary Examiner*—Allan D. Herrmann
*Attorney*—Waters, Roditi, Schwartz & Nissen

ABSTRACT: A freewheeling clutch of a roller type includes a driving sprocket, a driven race, a roller cage interposed between the sprocket and the race, the roller cage supporting spaced rollers positioned in recesses between radially extending spaced projections provided circumferentially on the sprocket, and a plurality of stops resiliently biasing against the opposite axial ends of the rollers, which stops are supported by the race to rotate therewith.

FREE-WHEELING CLUTCH

The present invention relates to devices for unidirectional transmission of torque and, more particularly, to roller-type freewheeling clutches (overrunning clutches).

Clutches according to this invention are employed in power plants of transport vehicles, for example, in a helicopter power plant.

In known roller-type freewheeling clutches, rotation from the driving shaft to the driven shaft is transmitted by rollers wedged between driving and driven elements, i.e. a sprocket and race. To provide for a simultaneous wedging of all the rollers at one time, the latter are placed in cylindrical seats of a roller cage acted upon by coil springs. The springs are set between projections of the sprocket and the roller cage and constantly press the rollers through the roller cage against the working surfaces of the sprocket and the race (cf. U.S. Pat. No. 2,068,773, class 192-45, 1937).

A disadvantage of the known freewheeling clutch is the constant pressure of the rollers against the working surfaces of the sprocket and the race. With a reverse direction of the torque (at the overrunning duty) this causes rotation of the rollers, which results in a rapid wear of the working surfaces of the rollers, sprocket and race.

In addition, the design of the roller cage is complicated due to fastening of the springs thereto, as well as due to the provision of seats with cylindrical surfaces.

An object of the present invention is to eliminate the foregoing disadvantages and to provide a freewheeling clutch, which has a long service life and is relatively simple in design.

In accordance with the invention and in the accomplishment of the above and other objects thereof, the rollers are resiliently clamped at their ends, projecting from the seats of the roller cage, between stops rotating together with the driven element of the clutch. The friction force developed between the surfaces of the stops and the roller ends prevents the rollers from being displaced along the circumference at the beginning of rotation of the driving element of the clutch (the sprocket) when the engine starts. At this moment, all the rollers are wedged instantly and simultaneously.

A side pressing of the rollers prevents them from skewing in the roller cage seats having rectilinear surfaces.

It is feasible to fashion the stops as rings, at least one of said rings being displaceable relative to the driven part of the clutch along the rotation axis in order to provide a resilient clamping of the rollers.

The resilient clamping of the rollers with the aid of such rings may be better accomplished if either a wave-shaped or a flat ring is used.

The invention is further exemplified by the description of an embodiment thereof and accompanying drawings, in which.

Figure 1:
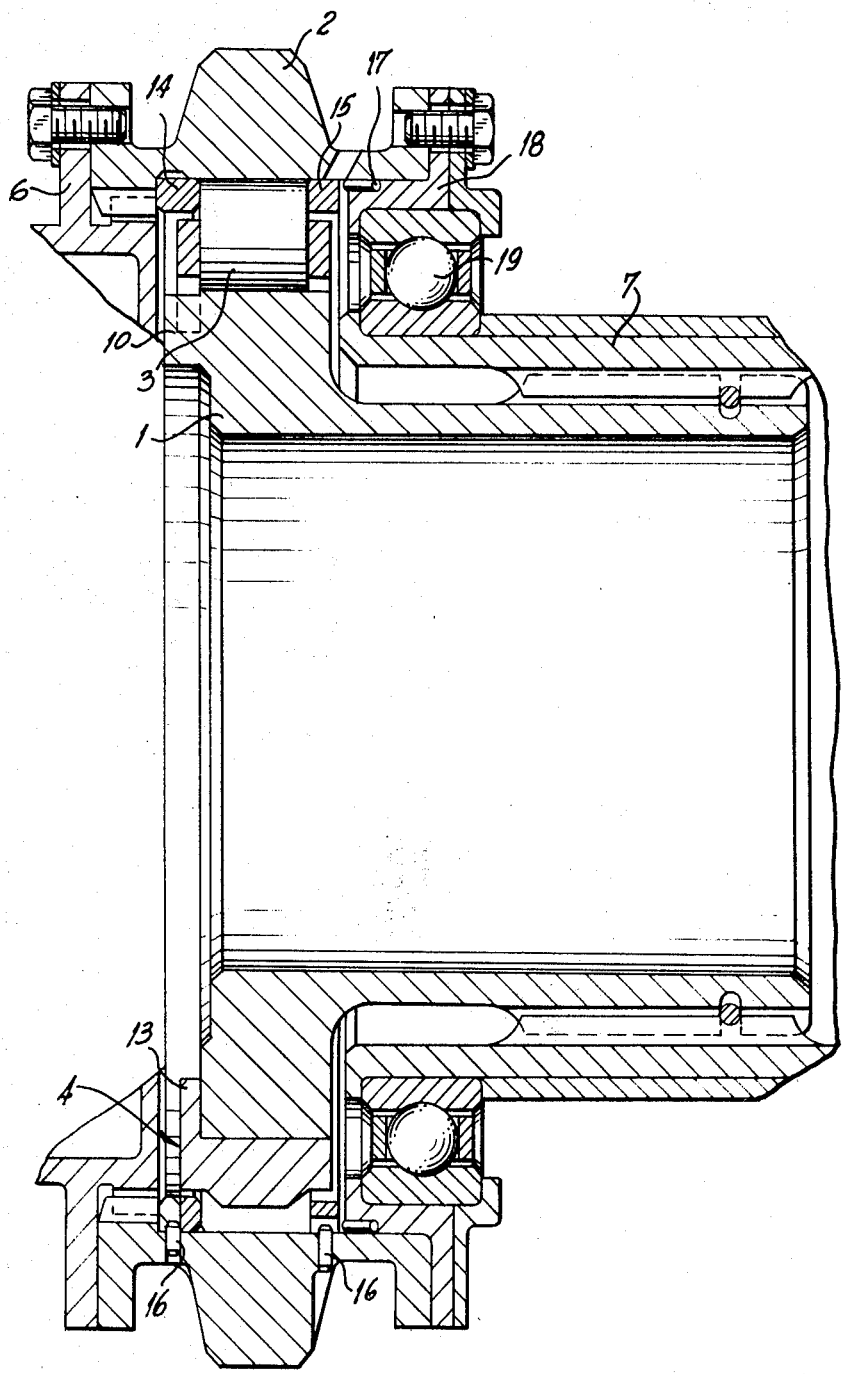
FIG. 1 shows a longitudinal section of a freewheeling clutch in accordance with the invention.
Figure 2:
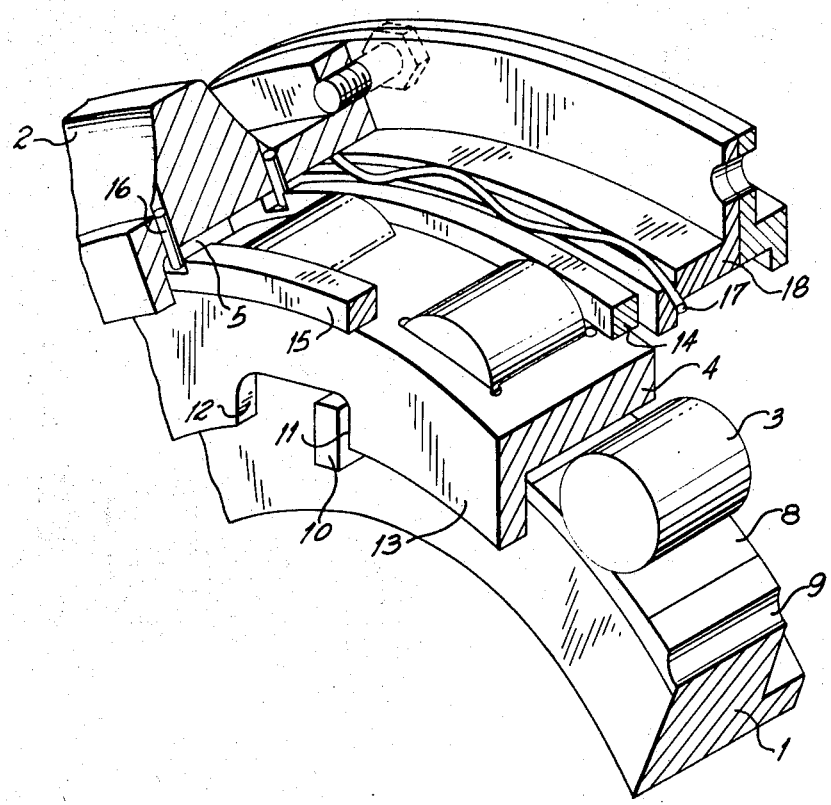
FIG. 2 is an axonometric view of a part of said clutch.

The freewheeling clutch of the present invention consists of a driving element, a sprocket 1 (FIGS. 1 and 2), transmitting the torque to a driven element, a race 2, through rollers 3 spaced at equal distances from each other by a roller cage 4.

The race 2 has a cylindrical inner surface 5, concentrically arranged relative to the periphery of the sprocket 1, and is rigidly coupled to a driven shaft 6.

The sprocket 1 is secured to a driving shaft 7 by means of a splined connection. The sprocket periphery is provided with a plurality of circumferentially spaced, radially extending projections 8. The clearance between the inner cylindrical surface 5 of the race 2 and the periphery of the sprocket 1 has alternating narrowing and widening portions, the rollers 3 being wedged in the former when the clutch transmits the torque from the driving shaft 7 to the driven shaft 6. With a reverse direction of the torque (at the overrunning duty) the rollers slide over the projections 8 into the recesses 9. The process is speeded up by means of axially extending projections 10 of the sprocket 1 which, when thrust against the edge 11 of a cut 12 of a flange 13 of the roller cage 4, stop the latter.

Stop rings 14 and 15 are placed at the ends of the rollers 3, which rings revolve together with the race 2 and are connected with it by means of pins 16 entering the ring slots and secured in the race.

The rings 14 and 15 are capable of axial displacement.

The rollers 3 are resiliently clamped between the rings 14 and 15 by a wave-shaped spring 17 placed between the ring 14 and a ring 18 embracing a ball bearing 19.

Friction between the ends of the rings 14 and 15 and the ends of the rollers 3 prevents the latter from being displaced when the sprocket 1 rotates.

Therefore, at the very beginning of rotation of the sprocket 1 the rollers 3 clamped at the ends are smoothly and almost instantly clamped in the narrowing portions of the clearance between the race 2 and the sprocket 1.

Figure 3:
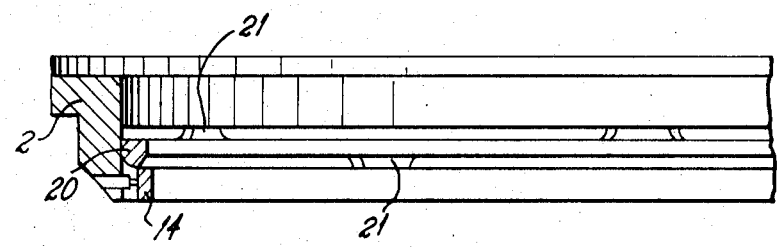
FIG. 3 shows an embodiment of an elastic element for clamping the rollers, fashioned as a flat spring.

The resilient element of the clutch may be fashioned as a flat ring spring 20 (FIG. 3) with projections 21 alternating at the lateral sides of the spring ring.

It is possible to make one of the stops integral with the driven element of the clutch. This reduces the number of the clutch parts, although the driving element becomes somewhat more complicated.

A test model of the freewheeling clutch according to the present invention is capable of transmitting 5,500 h.p. at 7,800 r.p.m.

Switching of the clutch occurs after the driving shaft rotates by 5° to 15° of its turn from the out-of-gear position.

We claim:

1. A freewheeling clutch of roller type, comprising: a driving sprocket; a driven race; said sprocket being provided with a plurality of circumferentially spaced projections; a plurality of spaced rollers positioned between said projections of said sprocket; a roller cage supporting said rollers; and means supporting a plurality of stops on said race to rotate therewith, said stops being arranged axially opposite the ends of said rollers, said rollers being resiliently and axially pressed at said ends between said stops.

2. A freewheeling clutch as set forth in claim 1, in which at least one of said stops is a ring and connected to said race as to be axially movable relative to the rotation axis of said clutch.

3. A freewheeling clutch as set forth in claim 2, in which said rollers are resiliently clamped between said ring stops by means of at least one wave-shaped ring spring.

4. A freewheeling clutch as set forth in claim 2, in which said rollers are resiliently clamped between said ring stops by means of at least one flat ring spring.